United States Patent
Beckner

(10) Patent No.: US 11,143,362 B2
(45) Date of Patent: Oct. 12, 2021

(54) STORAGE TANK FOR PRESSURIZED GAS AND METHOD OF MANUFACTURING SAME

(71) Applicant: GM GLOBAL TECHNOLOGY OPERATIONS LLC, Detroit, MI (US)

(72) Inventor: Matthew Beckner, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 182 days.

(21) Appl. No.: 16/506,324

(22) Filed: Jul. 9, 2019

(65) Prior Publication Data
US 2021/0010640 A1    Jan. 14, 2021

(51) Int. Cl.
*F17C 1/16*    (2006.01)

(52) U.S. Cl.
CPC ........ *F17C 1/16* (2013.01); *F17C 2201/0109* (2013.01); *F17C 2203/0604* (2013.01); *F17C 2203/0621* (2013.01); *F17C 2203/0673* (2013.01); *F17C 2205/0305* (2013.01); *F17C 2209/2163* (2013.01); *F17C 2221/012* (2013.01); *F17C 2223/0123* (2013.01); *F17C 2223/036* (2013.01)

(58) Field of Classification Search
CPC ................ F17C 1/16; F17C 2201/0109; F17C 2201/056; F17C 2221/012; F17C 2223/0123; F17C 2223/036; F17C 2223/064
USPC .......................... 220/589, 587, 62, 62.19, 901
See application file for complete search history.

(56) References Cited

U.S. PATENT DOCUMENTS

| | | | |
|---|---|---|---|
| 7,870,971 B2 * | 1/2011 | Schlag | B29C 70/32 220/585 |
| 8,906,287 B2 | 12/2014 | Hatta | |
| 9,618,160 B2 | 4/2017 | Eihusen et al. | |
| 2006/0032532 A1 | 2/2006 | Uwe et al. | |
| 2006/0218940 A1 * | 10/2006 | Starkovich | F17C 11/005 62/45.1 |

(Continued)

FOREIGN PATENT DOCUMENTS

JP    2011106514 A    6/2011

OTHER PUBLICATIONS

Endo, Kim, Takeda, Maeda, Hayashi, Koshiba, Hara, Dresselhaus; Poly (vinylidene chloride)-Based Carbon as an Electrode Material for High Power Capacitors with an Aqueous Electrolyte; Journal of Electrochemical Society Inc.; 2001; 148 (10) A1135-A1140(2001); ecsdf.org.

(Continued)

*Primary Examiner* — King M Chu
(74) *Attorney, Agent, or Firm* — Quinn IP Law

(57) ABSTRACT

A storage tank for pressurized gas includes a liner defining an interior cavity for storing the pressurized gas. The storage tank further includes a nanoporous carbon shell formed from at least one pyrolyzed polymer. The liner is disposed at an inner side of the nanoporous carbon shell. The storage tank further includes a carbon fiber reinforced polymer layer disposed on an outer side of the nanoporous carbon shell opposite from the liner. The nanoporous carbon shell has an exposed surface at an exterior of the storage tank and is configured to permit gas permeated through the liner from the interior cavity to diffuse through the nanoporous carbon shell to the exposed surface.

20 Claims, 7 Drawing Sheets

(56) References Cited

U.S. PATENT DOCUMENTS

| | | | |
|---|---|---|---|
| 2010/0146992 A1* | 6/2010 | Miller | F17C 3/04 62/47.1 |
| 2013/0341235 A1 | 12/2013 | Mark | |
| 2014/0263366 A1 | 9/2014 | Patrick et al. | |
| 2015/0298857 A1 | 10/2015 | Miller | |
| 2016/0023381 A1 | 1/2016 | Mazabraud et al. | |
| 2017/0328518 A1 | 11/2017 | Pegel et al. | |
| 2018/0259129 A1 | 9/2018 | Christ | |

OTHER PUBLICATIONS

Lamond, Metcalfe,III, Walker Jr.; Å Molecular Sieve Properties of Saran-Type Carbons; Carbon 1965, vol. 3, pp. 59-63, Pergamon Press Ltd.

* cited by examiner

STORAGE TANK FOR PRESSURIZED GAS AND METHOD OF MANUFACTURING SAME

INTRODUCTION

The disclosure relates to gas storage tanks. More specifically, the disclosure relates to gas storage tanks having a pyrolyzed carbon shell for releasing permeated gas, and to methods of manufacturing such storage tanks.

Tanks for storing pressurized gas may have multiple layers, including layers configured to seal the gas, and other layers configured to increase strength and durability. Considerations in designing such tanks include compatibility of materials, weight, and ease of manufacturing. Gas storage tanks used on vehicles, such as those used to store hydrogen gas on a fuel cell vehicle, may experience permeation of hydrogen gas molecules into one or more of the layers during defueling due to a temperature drop in the tank associated with the decrease in gas pressure.

SUMMARY

A storage tank for pressurized gas includes a nanoporous carbon shell that facilitates the removal of trapped permeated gas. When pressurized gas in the storage tank is at relatively high pressure, gas molecules diffuse into the tank layers surrounding the interior cavity. As the gas in the interior cavity is used and the interior cavity depressurizes, a resulting temperature drop occurs. Different thermal expansion coefficients of the materials of the storage tank and/or a rapid depressurization of the tank may lead to the permeated gas being trapped between an inner liner of the tank and a surrounding carbon reinforced polymer layer. The nanoporous carbon shell solves this problem by enabling venting of the trapped gas. Accordingly, other less desirable options for avoiding the issue of trapped gas need not be implemented. For example, increasing the minimum pressure in the tank would reduce gas permeation, but would also decrease vehicle range.

The storage tank disclosed herein, solves the problem of trapped gas so that in-use minimum tank pressures and overall tank strength and durability are not affected. More specifically, the storage tank includes a liner defining an interior cavity for storing the pressurized gas. The storage tank further includes a nanoporous carbon shell formed from at least one pyrolyzed polymer. The liner is disposed at an inner side of the nanoporous carbon shell. The storage tank further includes a carbon fiber reinforced polymer layer disposed on an outer side of the nanoporous carbon shell opposite from the liner. The nanoporous carbon shell has an exposed surface at an exterior of the storage tank and is configured to permit gas permeated through the liner from the interior cavity to diffuse through the nanoporous carbon shell to the exposed surface.

In an example, the pressurized gas may be hydrogen gas. Furthermore, the nanopores of the nanoporous carbon shell may define a plurality of nanopores, each having a pore width of less than or equal to 1 nanometer. For example, at least a majority of pores in the carbon shell are nanopores having a pore width of less than or equal to 1 nanometer. In one embodiment at least 80 percent of the pores of the carbon shell are nanopores having a pore width of less than or equal to 1 nanometer. Additionally, the carbon fiber reinforced polymer layer may include a matrix of resin molecules each having a molecular width greater than 1 nanometer. Accordingly, the nanopores of the nanoporous carbon shell are large enough to permit diffusion of permeated hydrogen gas, but small enough to prevent entry of resin molecules of the carbon reinforced polymer layer before and during heating and curing of the carbon reinforced polymer layer at the outer side of the nanoporous carbon shell. The nanoporous carbon shell is also relatively rigid and hard, adding strength and increasing durability of the storage tank. For example, the nanoporous carbon shell may be configured to maintain a preformed shape when a pressure level in the interior cavity is from 0 megapascals (MPa) to 100 MPa (e.g., 87.5 MPa).

In an aspect, the storage tank may further include a boss secured between the liner and the nanoporous carbon shell adjacent to the exposed surface. The boss further encloses the interior cavity. For example, the exposed surface may be an annular ring around the boss. The boss may be a first boss secured between a first end portion of the liner and a first end portion of the nanoporous carbon shell. The storage tank may also include a second boss secured between a second end portion of the liner and a second end portion of the nanoporous carbon shell adjacent to an additional exposed surface at the exterior of the storage tank. The second boss further encloses the interior cavity. In such an embodiment, permeated gas may diffuse out of the nanoporous carbon layer more quickly, as there are two exit areas (the two exposed surfaces) at opposite ends of the storage tank.

The liner is unattached to (e.g., not chemically or physically bonded to) the inner side of the nanoporous carbon shell. For example, a release agent may be applied to the outer side of the liner so that it does not bond to the nanoporous carbon shell during manufacturing of the gas storage tank. This enables the liner to move away from the inner side of the nanoporous carbon shell (e.g., move inward) without loss of integrity if a pressure of the permeated gas between the liner and the nanoporous carbon shell is significant. However, given the ability of the permeated gas to diffuse through the nanoporous carbon shell and exit from the storage tank at the exposed surface (or surfaces) of the nanoporous carbon shell, inward buckling of the liner may be infrequent or nonexistent in any event.

In another aspect, the at least one pyrolyzed polymer may include a copolymer. For example, the nanoporous carbon shell may be formed from a copolymer precursor of poly(vinylidene chloride-co-vinyl chloride). In another alternative, the copolymer precursor may include poly(vinylidene fluoride-co-vinyl chloride). In still another aspect, the precursor that is pyrolyzed may be a mixture of a first halogenated polymer and a second halogenated polymer. Embodiments formed from block copolymers and embodiments formed from a mixture of a first polymer and a second polymer are both referred to herein as a polymer blends. In an example, whether a block copolymer or a mixture of two polymers, the polymers selected may have a carbon backbone attached solely to halogens and hydrogens. Example polymers include PVDC, PVC, poly(vinyl fluoride), poly(tetrafluoroethylene), polychloroprene, and any copolymer combinations of these or similar polymers. In some embodiments, other polymers with additional elements (e.g., elements other than or in addition to halogens and hydrogens) may be used. In another aspect, the precursor of the at least one pyrolyzed polymer may include acidified furfuraldehyde.

A method of manufacturing a storage tank for pressurized gas, such as the storage tank described herein, may include pyrolyzing at least one polymer to form a nanoporous carbon shell, and disposing a liner at an inner side of the nanoporous carbon shell. The liner defines an interior cavity for storing the pressurized gas. The method may further include securing a boss to the liner and the nanoporous carbon shell, the boss further enclosing the interior cavity.

In an example, pyrolyzing the at least one polymer may include heating the at least one polymer at a heating temperature that varies according to a stepped temperature profile. For example, the stepped temperature profile may include a first step at a first predetermined heating time at which the heating temperature increases to a first predetermined heating temperature, and a second step at a second predetermined heating time subsequent to the first predetermined heating time at which the heating temperature increases to a second predetermined heating temperature greater than the first predetermined heating temperature. A stepped temperature profile for pyrolyzing the at least one polymer may be most useful for certain polymers and certain mold materials, such as a poly(vinylidene chloride) (PVDC) polymer and a steel mold. When heated, a PVDC polymer produces hydrogen chloride gas, which is corrosive to steel. By first heating at the relatively low first predetermined heating temperature, corrosion of the mold is slowed, while the PVDC polymer is still sufficiently pyrolyzed to permit its removal from the mold while still retaining its partially pyrolyzed shape. The partially pyrolyzed PVDC polymer may then be moved to a second oven lined with a material that is chemically resistant to HCl gas (e.g., quartz) where it is then heated at the second predetermined temperature to complete the pyrolysis.

In an aspect, the at least one polymer may include a block copolymer having a carbon backbone and one or more halogens and hydrogen attached to the carbon backbone. In another aspect the at least one polymer may include a block copolymer of poly(vinylidene chloride-co-vinyl chloride). In still another aspect, the at least one polymer may be a mixture of a first polymer and a second polymer, such as a first halogenated polymer and a second halogenated polymer.

In an aspect, the method may include, prior to disposing the liner at the inner side of the nanoporous carbon shell, molding the liner from a polymer resin. For example, the molding of the liner may be by blow molding or injection molding.

In an aspect, the method may include, prior to disposing the liner at the inner side of the nanoporous carbon shell, applying a release agent to an outer side of the liner. The release agent will prevent the liner and the nanoporous carbon shell from bonding to one another.

In another aspect, the method may include filament winding a carbon fiber reinforced polymer layer at an outer side of the nanoporous carbon shell such that the nanoporous carbon shell has an exposed surface at an exterior of the storage tank. Gas permeated through the liner from the interior cavity may diffuse through the nanoporous carbon shell to the exposed surface.

In still another aspect, the method may include, prior to filament winding the carbon fiber reinforced polymer layer at the outer side of the nanoporous carbon shell, applying a release agent to an outer side of the nanoporous carbon shell to prevent the carbon fiber reinforced polymer layer and the nanoporous carbon shell from bonding or attaching to one another.

In still another aspect, the method may include, after filament winding the carbon fiber reinforced polymer layer at the outer side of the nanoporous carbon shell, heating the carbon fiber reinforced polymer layer, and curing the carbon fiber reinforced polymer layer.

The above features and advantages and other features and advantages of the present disclosure are readily apparent from the following detailed description of the best modes for carrying out the disclosure when taken in connection with the accompanying drawings.

DETAILED DESCRIPTION

Figure 1:
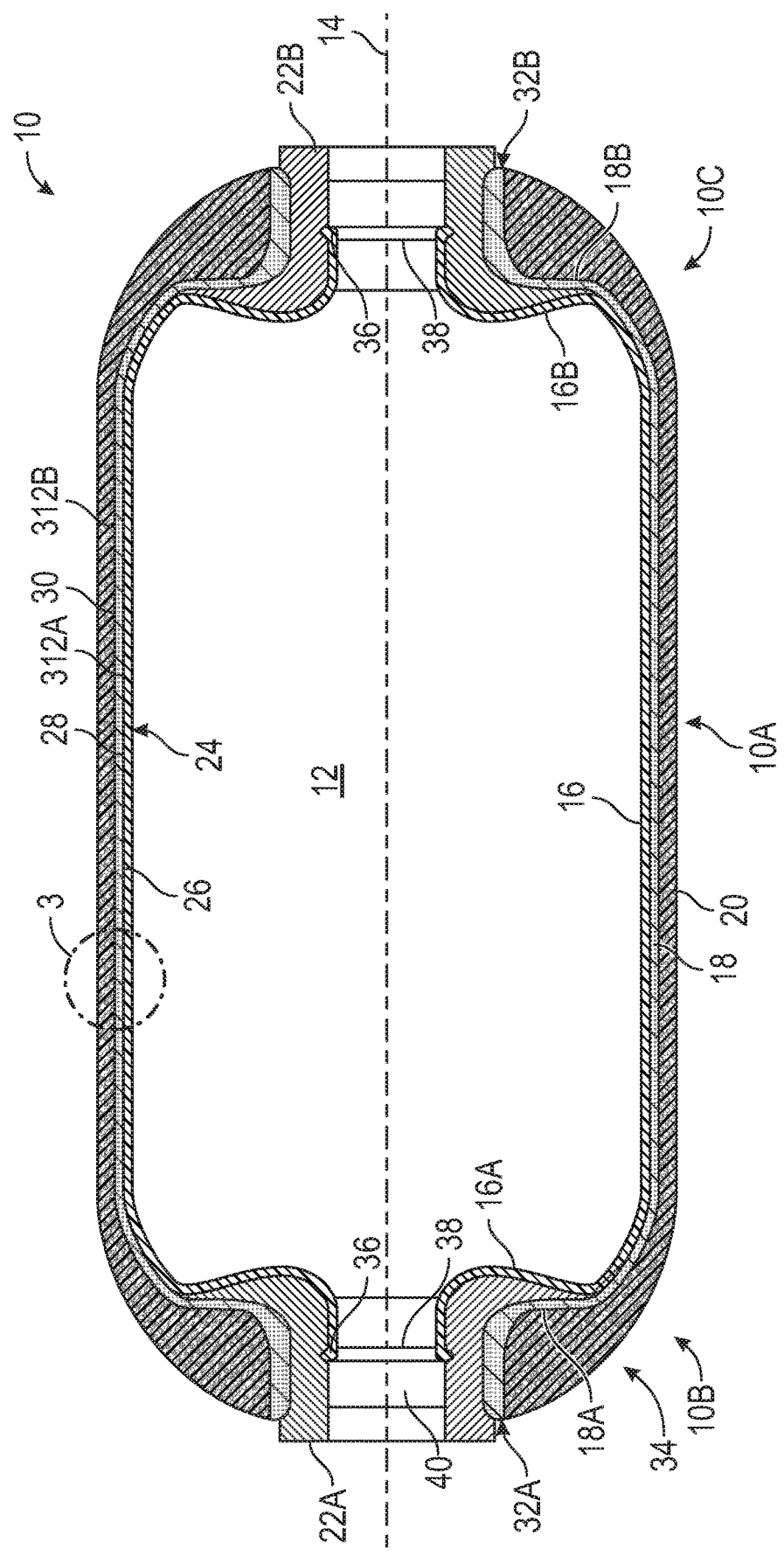
FIG. 1 is a cross-sectional view of a gas storage tank.

FIG. 1 is a cross-sectional view of a gas storage tank 10 according to aspects of the present disclosure. As shown, the gas storage tank 10 includes a generally elongated cylindrical middle portion 10A, a first end portion 10B, and an opposing second end portion 10C surrounding an interior cavity 12 and spaced along a longitudinal axis 14. In other embodiments, the gas storage tank 10 may have other shapes. In a direction outward from the interior cavity 12, the storage tank 10 includes a liner 16, a nanoporous carbon shell 18, and a carbon fiber reinforced polymer layer 20. Bosses 22A, 22B are installed on one or both end portions 10B, 10C as discussed herein, and may be plugged or house a valve (not shown) for accessing the pressurized gas. The gas storage tank 10 may or may not also include a glass overwrap around the outer surface of the carbon fiber reinforced polymer layer 20, foam caps over the domed end portions 10B, 10C, and other components and features. The gas storage tank 10 may be considered a Type IV tank and may be intended for use on a vehicle. For example, the gas storage tank 10 may be configured to be installed on a fuel cell vehicle for storing and delivering hydrogen gas ($H_2$).

The liner 16 defines the interior cavity. Stated differently, the interior cavity 12 is bounded by the inner surface 24 of the liner 16. The liner 16 may be formed from a polyamide or high-density polyethylene, for example. The nanoporous carbon shell 18 may be formed from at least one pyrolyzed polymer, as further discussed herein. The liner 16 is disposed at an inner side 26 of the nanoporous carbon shell 18. More specifically, an outer side 28 of the liner 16 fits within and may interface with the nanoporous carbon shell 18 at the inner side 26. However, the liner 16 is unattached to (e.g., not chemically or physically bonded to) the nanoporous carbon shell 18. For example, a release agent 312A, such as a mold release agent, may be disposed on the outer side 28 of the liner 16 and/or on the inner side 26 of the nanoporous carbon shell 18. Therefore, the outer side 28 may move away from the inner side 26 such as when gas permeates through the liner 16 during defueling. This avoids stresses on the liner 16 in comparison to a liner bonded or otherwise attached to an adjacent layer. The nanoporous carbon shell 18 is configured to vent such permeated gas as discussed herein, so that such movement of the liner 16 is minimal.

The carbon fiber reinforced polymer layer 20 is disposed on an outer side 30 of the nanoporous carbon shell 18 opposite from the liner 16 and adds strength to the storage tank 10. The carbon fiber reinforced polymer layer 20 covers a majority of the outer side 30 of the nanoporous carbon shell 18. However, the nanoporous carbon shell 18 has an exposed surface 32A at an exterior of the storage tank 10. Stated differently, the exposed surface 32A forms a portion of the exterior surface 34 of the storage tank 10. In the embodiment shown, there are two separate exposed surfaces 32A, 32B of the nanoporous carbon shell 18, one at each of the end portions 10B, 10C.

The boss 22A may be referred to as a first boss and is secured between a first end portion 16A of the liner 16 and a first end portion 18A of the nanoporous carbon shell 18 adjacent to the exposed surface 32A. The boss 22A is coupled to the liner 16 in a seal-tight manner and may have a terminal lip 36 that fits to a recess 38 in the first boss 22A. A fitting with a valve (not shown) may fit to the first boss 22A in a central opening 40. The valve may be operable to fill or remove gas from the interior cavity 12.

The boss 22B may be referred to as a second boss and may be configured in a like manner as the first boss 22A. The boss 22B may be secured between a second end portion 16B of the liner 16 and a second end portion 18B of the nanoporous carbon shell 18 adjacent to the additional exposed surface 32B at the exterior surface 34 of the storage tank 10. The second boss 22B further encloses the interior cavity 12. A fitting with a valve as described with respect to the first boss 22A may be fit to the second boss 22B at the central opening 40.

In other embodiments, one end portion of the tank 10 rather than both end portions may include a boss, and the liner 16, the nanoporous carbon shell 18, and the carbon fiber reinforced polymer layer 20 may each form a domed, closed end extending from an opposite end of the cylindrical middle portion 10A. However, by providing two bosses 22A, 22B, exposed surfaces 32A and 32B of the nanoporous carbon shell 18 are disposed at opposite ends of the storage tank 10, enabling permeated gas to diffuse out of the nanoporous carbon shell 18 more quickly as the average travel distance for a gas molecule through the nanopores of the nanoporous carbon shell 18 is less in comparison to an embodiment with an exposed surface at just one of the end portions 18A or 18B.

The at least one pyrolyzed polymer forming the nanoporous carbon shell 18 may be a copolymer. For example, the at least one polymer precursor that is pyrolyzed may include a block copolymer having a carbon backbone attached to one or more halogens and hydrogen. For example, the nanoporous carbon shell 18 may be formed from a copolymer precursor of poly(vinylidene chloride-co-vinyl chloride). Example stoichiometry for pyrolysis of a PVDC-PVC copolymer is as follows in EQN. 1:

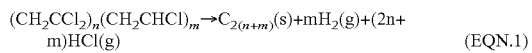

(EQN.1)

The ratio of halogen atoms to hydrogen atoms in the material used to form the nanoporous carbon shell 18 affects the resulting porosity and can be controlled by using a copolymer as discussed. Porosity of the resulting nanoporous carbon shell 18 can also be influenced by selecting the ratio of the first polymer to the second polymer in the polymer blend (e.g., by selecting the ratio of n to m in the above equation (EQN. 1). The degree of crosslinking within each polymer and the type of copolymer (e.g., block, alternating, etc.) also may influence the porosity of the resulting nanoporous carbon shell 18.

In another alternative, the copolymer precursor may be poly(vinylidene fluoride) and poly(vinyl chloride). In still another aspect, the halogenated polymer blend precursor may be a mixture of a first halogenated polymer and a second halogenated polymer that is chemically different from the first halogenated polymer. Embodiments formed from block copolymers and embodiments formed from a mixture of a first halogenated polymer and a second halogenated polymer are both referred to herein as a pyrolyzed halogenated polymer blend. In an example, whether a block copolymer or a mixture of two polymers, the polymers selected may have a carbon backbone attached solely to halogens and hydrogens. Example polymers include PVDC, PVC, poly(vinyl fluoride), poly(tetrafluoroethylene), polychloroprene, or copolymer combinations of these or similar polymers. In some embodiments, other polymers with additional elements (e.g., elements other than or in addition to halogens and hydrogens) may be used, such as, for example acidified furfuraldehyde.

Figure 2:
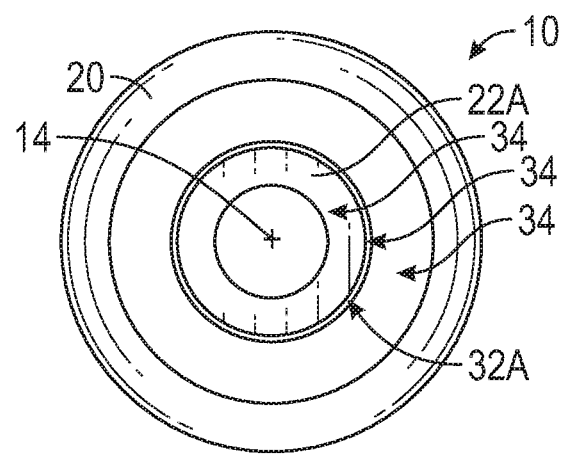
FIG. 2 is an end view of the gas storage tank of FIG. 1.

FIG. 2 is an end view of the gas storage tank 10 and shows the substantially cylindrical configuration of the tank 10. In the end view, the entire exposed surface 32A is shown. For example, the exposed surface 32A may be an annular ring around the boss 22A at the exterior surface 34. The exposed surface 32B may likewise be an annular ring around the boss 22B at the exterior surface 34. In other embodiments, one or more than one discrete exposed surface may be present and these may be in annular shapes or other shapes.

Figure 3:
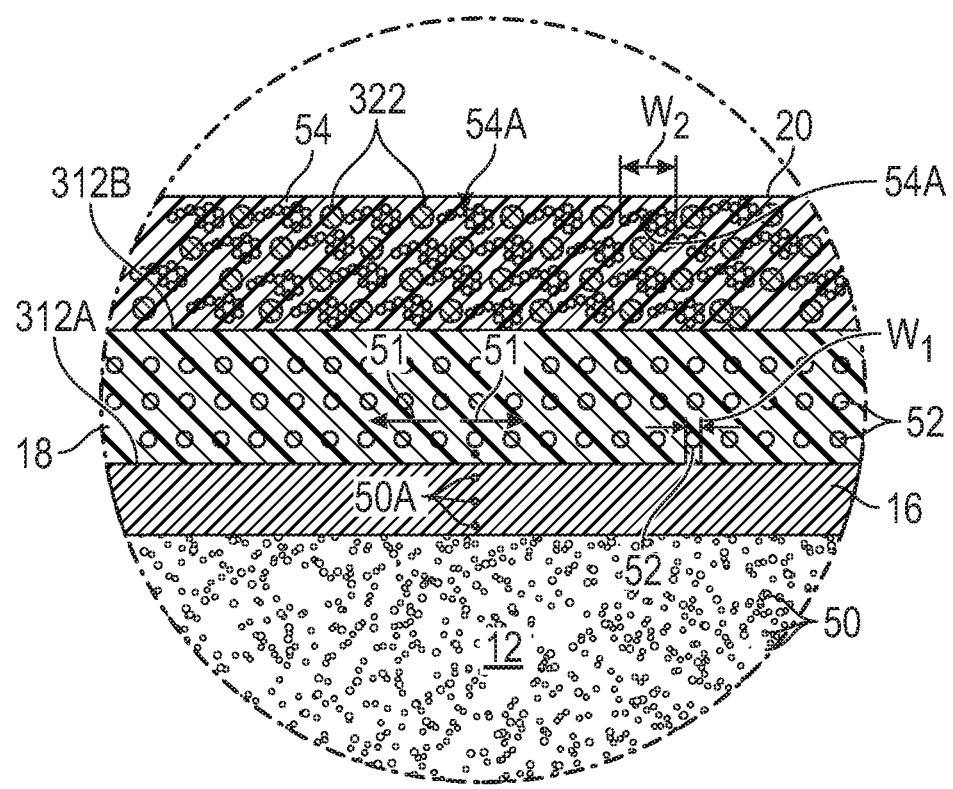
FIG. 3 is a fragmentary closeup view of a portion of the cross-section of the gas storage tank of FIG. 1.

FIG. 3 is a fragmentary closeup view of a portion of the cross-section of the gas storage tank 10 of FIG. 1. Pressurized gas 50 is schematically depicted in the interior cavity 12, with some of the gas 50 represented at 50A permeating through the liner 16 and then diffusing through nanopores 52 of the nanoporous carbon shell 18 as depicted at arrows 51. The permeated gas 50A diffuses through the nanopores 52 and exits from the nanoporous carbon shell 18 at the exposed surfaces 32A, 32B in FIG. 1. The nanoporous carbon shell 18 is thus configured to permit gas 50A permeated through the liner 16 from the interior cavity 12 to diffuse through the nanoporous carbon shell 18 to the exposed surface(s) 32A and 32B. For example, the pressurized gas 50 may be hydrogen gas $H_2$. As depicted, a majority of the nanopores 52 of the nanoporous carbon shell 18 have a pore width W1 of less than or equal to 1 nanometer, which is still greater than a width of a hydrogen gas molecule ($H_2$). In the example of the carbon shell 18 formed by pyrolysis of the block copolymer PVDC-PVC, 80 percent of the pores of the carbon shell 18 may have a pore width W1 of less than or equal to 1 nanometer.

Additionally, the carbon fiber reinforced polymer layer 20 may include carbon fiber filaments 322 in a matrix of a cured resin 54. The carbon fiber filaments 322 are also discussed with respect to FIG. 8. The resin 54 includes resin molecules 54A each having a molecular width W2 of greater than 1 nanometer. Accordingly, the nanopores 52 of the nanoporous carbon shell 18 are large enough to permit diffusion of permeated hydrogen gas $H_2$, but small enough to prevent entry of the resin molecules 54A of the carbon fiber reinforced polymer layer 20 such as before or during heating and curing of the carbon fiber reinforced polymer layer 20 at the outer side 30 of the nanoporous carbon shell 18. The molecular width of resin molecules used in carbon fiber reinforcement layers on Type IV tanks is generally greater than 1 nanometer.

The nanoporous carbon shell 18 is also relatively rigid and hard, increasing the durability of the storage tank 10. For example, the nanoporous carbon shell 18 may be configured to maintain a preformed shape when a pressure level of a gas in the interior cavity 12 is from 0 megapascals (MPa) to 100 MPa (e.g. 87.5 MPa). Stated differently, the nanoporous carbon shell 18 will not deform (e.g., will not be squeezed outward at the exposed surfaces 32A, 32B) when the stored gas is at its highest pressure.

Figure 4:
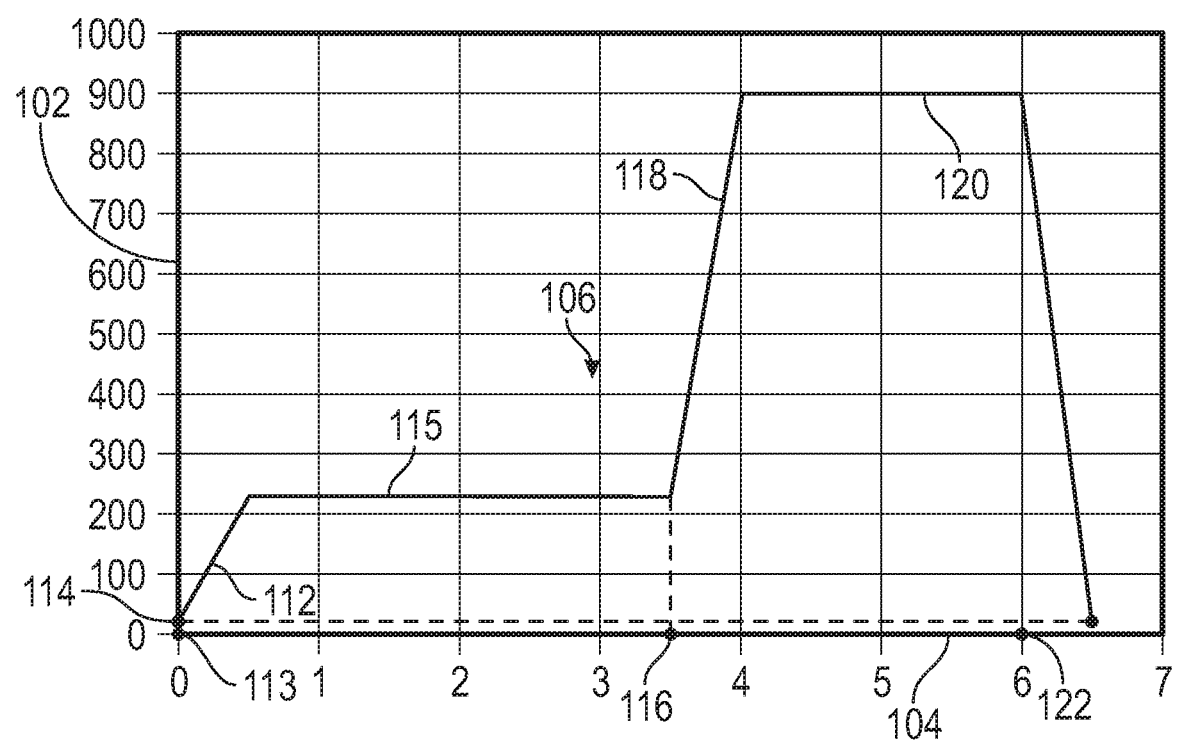
FIG. 4 is a plot of heating temperature versus time depicting an example heating temperature profile for pyrolyzing at least one polymer to form a nanoporous carbon shell included in the gas storage tank of FIG. 1.

FIG. 4 is a plot of heating temperature 102 in degrees Celsius versus time 104 in hours, depicting an example heating temperature profile 106 for pyrolyzing the at least one polymer 110 described herein to form the nanoporous carbon shell 18. In an example, pyrolyzing the at least one polymer 110 includes heating the at least one polymer 110 at a heating temperature 102 that varies according to a stepped heating temperature profile 106. For example, the heating temperature profile 106 may include a first step 112 at a first predetermined heating time 113 (such as time 0 in FIG. 4) at which the heating temperature increases from an ambient temperature such as room temperature 114 to a first predetermined heating temperature 115. The heating temperature profile 106 may remain at the first predetermined heating temperature 115 for an extended period until a second predetermined heating time 116 at which a second step 118 occurs. At the second step, the heating temperature increases to a second predetermined heating temperature 120 greater than the first predetermined heating temperature 115. At a third predetermined heating time 122, heating is completed, and the temperature begins dropping back to the room temperature 114.

The temperature profile followed during pyrolyzing will depend upon the starting material of the at least one polymer. In some embodiments, there may be just one temperature step. Adjusting the pyrolysis temperature (e.g., the predetermined heating temperature 115 or 120) or the temperature profile affects both the porosity of the resulting nanoporous carbon shell 18 (e.g., both the number of pores per unit volume of the carbon shell and the average pore width). A temperature profile with two temperature steps, such as the stepped heating temperature profile 106 for pyrolyzing the at least one polymer 110 is useful for certain polymers and certain mold materials, such as if the halogenated polymer blend includes a PVDC polymer and is pyrolyzed in a steel mold. When heated, a PVDC polymer produces hydrogen chloride (HCl) gas, which is corrosive to steel. During heating, nitrogen gas ($N_2$) may be continually flowed through the oven to purge hydrogen chloride (HCl) gas released from the halogenated polymer blend during pyrolyzing. By first heating at the relatively low first predetermined heating temperature 115 in a first oven, corrosion of the steel mold is slowed, while the PVDC polymer is still pyrolyzed enough that it can be removed from the steel mold and still retain its shape. The partially pyrolyzed PVDC polymer may then be moved to a second oven lined with a material that is chemically resistant to HCl gas (e.g., quartz) to heat at the second predetermined heating temperature 120 and finish the pyrolysis.

Figure 5:
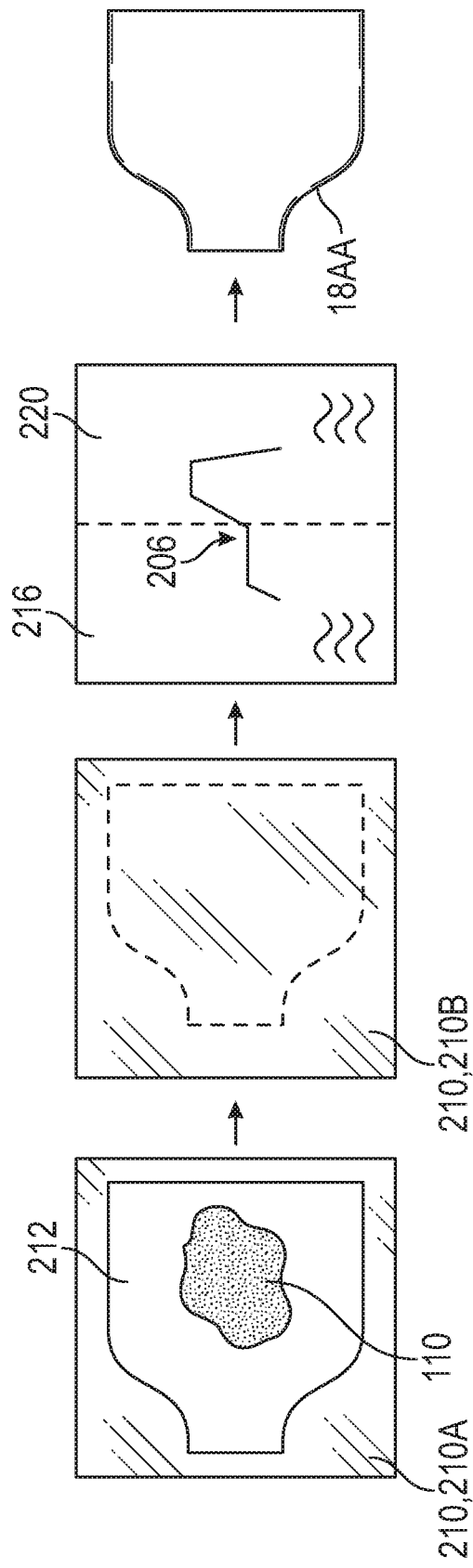
FIG. 5 is a schematic depiction of manufacturing the nanoporous carbon shell included in the gas storage tank of FIG. 1.

FIG. 5 is a schematic depiction of manufacturing the nanoporous carbon shell 18 included in the gas storage tank 10 of FIG. 1. The at least one polymer 110 is placed in a mold cavity 212 of a first portion 210A of a mold 210. The mold 210 is then sealed, such as by securing one or more additional mold portions 210B to the first portion 210A to compression mold the at least one polymer 110. Next, the at least one polymer 110 is pyrolyzed by heating, such as according to the temperature profile 206 described herein. Heating at the first predetermined temperature 114 may occur by placing the mold 210 containing the at least one polymer 110 in a first oven 216, and heating at the second predetermined heating temperature 120 may be in a second oven 220. The ovens 216, 220 are shown separated by a dashed line to indicate that they may, in some examples, be a single oven, or may be adjacent to and/or connected with one another to reduce heat loss. After heating, the now pyrolyzed at least one polymer is in the shape of one half shell 18AA of the nanoporous carbon shell 18 and includes a network of nanopores 52 as described. The pyrolyzed carbon half shell 18AA is removed from the mold 210 and allowed to cool. A second pyrolyzed half shell 18BB (shown in FIG. 7) is manufactured in the same manner. The two halves may be secured to one another by tape or adhesive when abutted together during assembly of the gas storage tank 10 as discussed herein to form a unitary, one-piece nanoporous carbon shell 18. Although described as half shells, in other embodiments shell portions of different relative proportions may be used.

Figure 6:
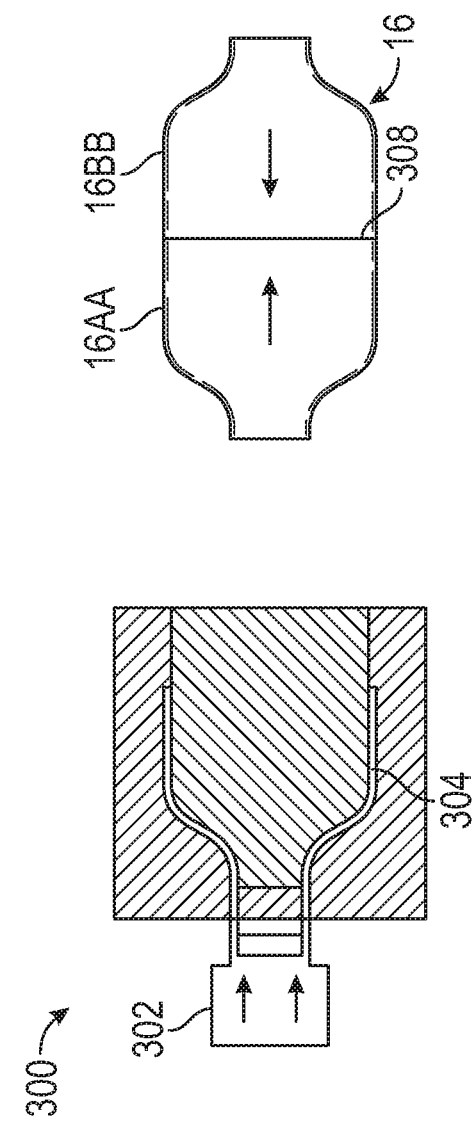
FIG. 6 is a schematic depiction of manufacturing a liner included in the gas storage tank of FIG. 1

FIG. 6 is a schematic depiction of manufacturing the liner 16 included in the gas storage tank 10 of FIG. 1. The liner 16 is formed from a polymer resin. For example, the molding of the liner 16 may be by blow molding or injection molding the polymer resin material into a mold. FIG. 6 shows an example injection mold 300 that includes a source 302 of polymer resin that is injected into a mold cavity 304. The injection mold 300 may be referred to herein as a second mold. The mold cavity 304 is for forming a portion of the liner 16 of FIG. 1. Although in the embodiment herein the mold forms half of the liner 16, and the resulted molded portion is referred to as a half liner, different mold portions could be used to form less than or more than half of the liner 16. After molding half of the liner 16, e.g., liner half 16AA, it is removed from the mold 300 and allowed to cool. A second liner half 16BB or portion is then molded in the same or a different mold 300. Once the second liner half 16BB is removed from the mold 300 and allowed to cool, the two larger cylindrical ends of the liner halves 16AA, 16BB are abutted and welded to one another at a center weld 308, such as by radiofrequency welding. Outer flash at the weld may then be machined off to be flush with the outer side 28 of the liner 16.

Figure 7:
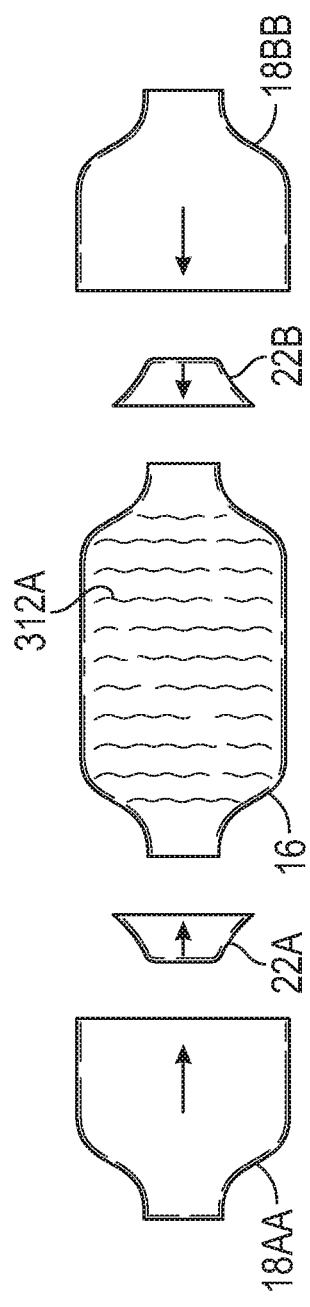
FIG. 7 is a schematic depiction of manufacturing the gas storage tank of FIG. 1 by assembling the nanoporous carbon shell, the liner, and bosses.
Figure 7:
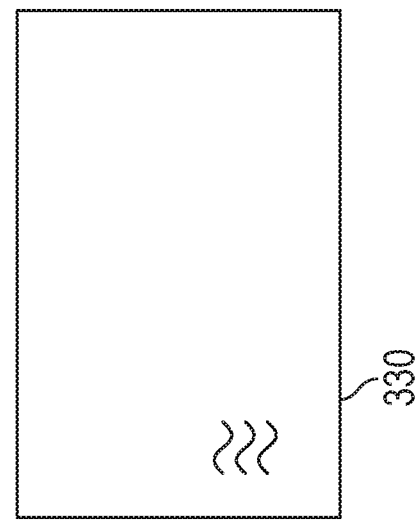

FIG. 7 is a schematic depiction of manufacturing the gas storage tank 10 of FIG. 1 by assembling the nanoporous carbon half shells, the liner, and the bosses. A release agent 312A may first be applied to the outer side 28 of the liner 16. The liner 16 may then be secured to the bosses 22A, 22B at the openings 40, and the nanoporous carbon half shells 18AA, 18BB can be assembled over the bosses 22A, 22B, respectively, so that the liner 16 is disposed at the inner side 26 of the nanoporous carbon shell 18. The half shells 18AA, 18BB can be bound together, such as by applying tape along a seam 314 (shown in FIG. 8) formed by their abutted cylindrical ends. Alternatively, adhesive may be used. In some embodiments, the two abutted half shells 18AA, 18BB are not held together by an added attachment component such as tape or adhesive, as the first layer of carbon fiber of the carbon fiber reinforced polymer layer 20 wound onto the carbon shell 18 may hold them sufficiently in place relative to one another. Additionally, temporary clamps 316 (see FIG. 8), may be installed as positioning rings around each boss 22A, 22B against the narrower outer ends of the nanoporous carbon shell 18 to hold the bosses 22A, 22B, the liner 16, and the nanoporous carbon half shells 18AA, 18BB in place relative to one another at the start of the filament winding of the carbon fiber reinforced polymer layer 20 at the outer side 30 of the nanoporous carbon shell 18. Prior to the filament winding, another release agent 312B may be applied to the outer side 30 of the nanoporous carbon shell 18 (e.g., the same or a different mold release agent).

Figure 8:
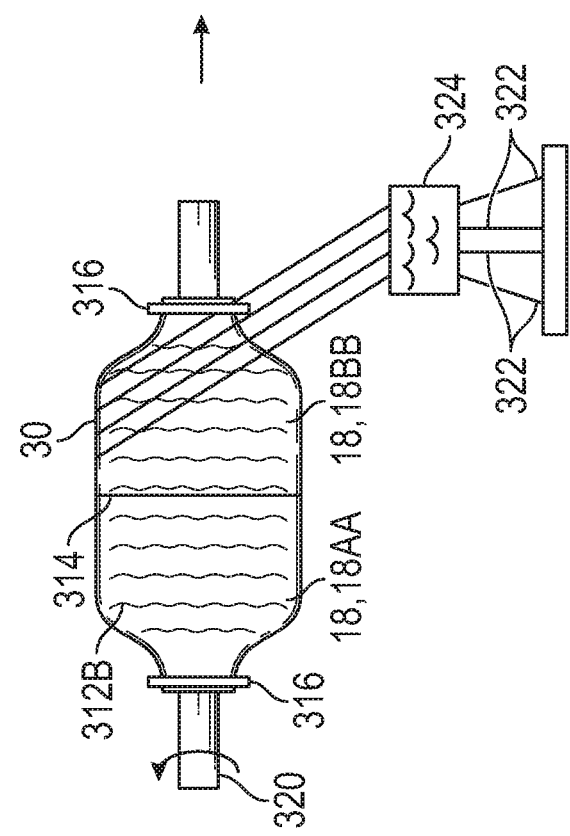
FIG. 8 is a schematic depiction of manufacturing the gas storage tank of FIG. 1 by filament winding a carbon fiber reinforced polymer layer at an outer side of the nanoporous carbon shell of FIG. 1.

FIG. 8 is a schematic depiction of filament winding the carbon fiber reinforced polymer layer 20 at the outer side 30 of the nanoporous carbon shell 18 of FIG. 1. The assembled liner 16, nanoporous carbon shell 18, and bosses 22A, 22B are placed on a mandrel 320 which rotates while carbon fiber filaments 322 under tension are run through a polymeric resin bath 324 and wound onto the outer side 30 of the nanoporous carbon shell 18. Temporary clamps 316, if used, may be removed once a first layer of the filaments 322 are wound onto the shell 18. Once filament winding of the resin-covered carbon fiber filaments 322 onto the nanoporous shell 18 is complete, the assembled carbon fiber reinforced polymer layer 20, nanoporous carbon shell 18, and liner 16 with bosses 22A, 22B is placed in an oven 330 to heat the carbon fiber reinforced polymer layer 20 to initiate curing and then cure the carbon fiber reinforced polymer layer 20, possibly assisted by curing additives included in the resin bath 324. The assembled components are then removed from the oven 330 as the completed storage tank 10 of FIG. 1 and are allowed to cool.

Figure 9A:
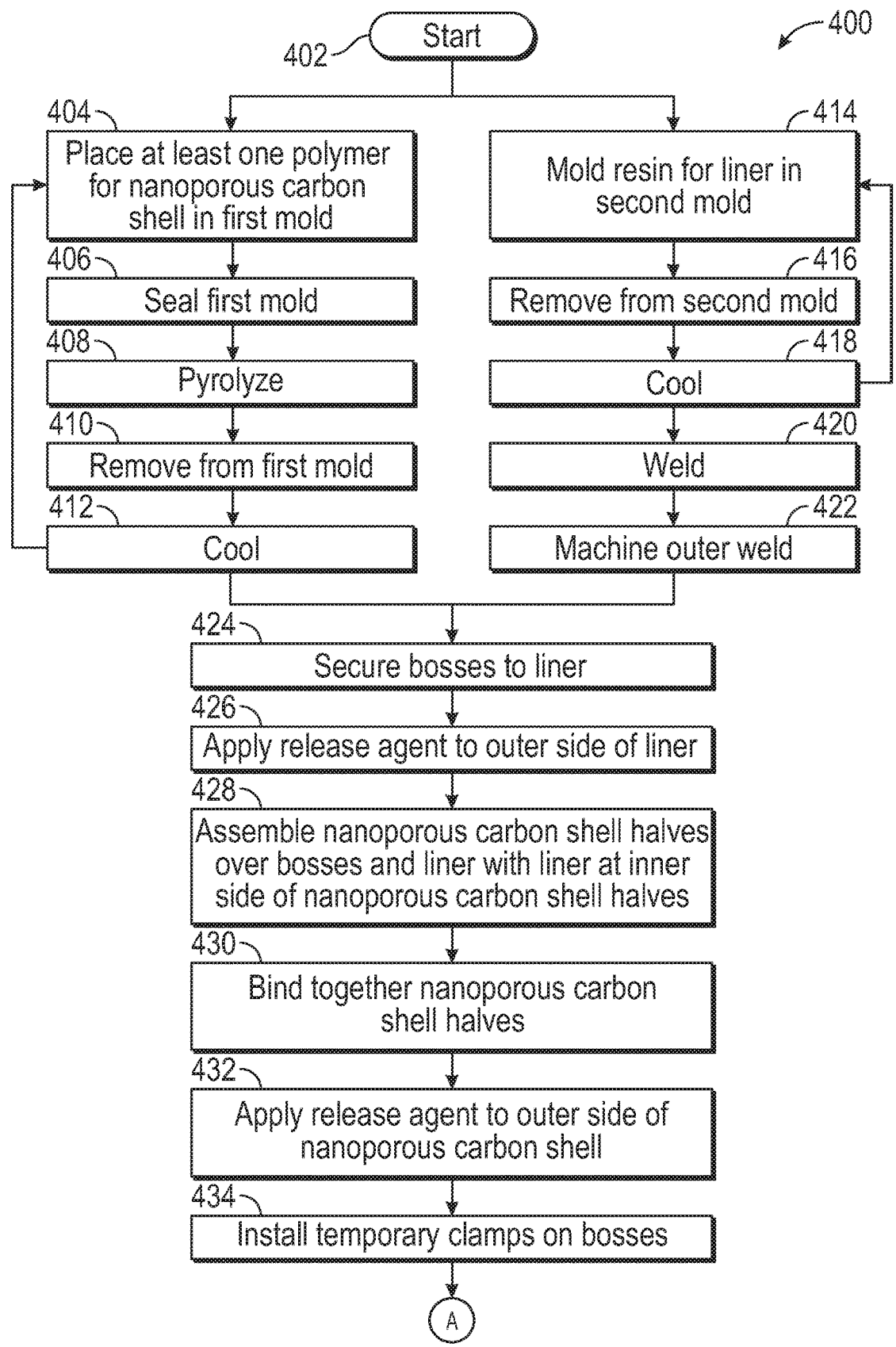
FIG. 9A is a first portion of a flow diagram of a method of manufacturing the gas storage tank of FIG. 1.
Figure 9B:
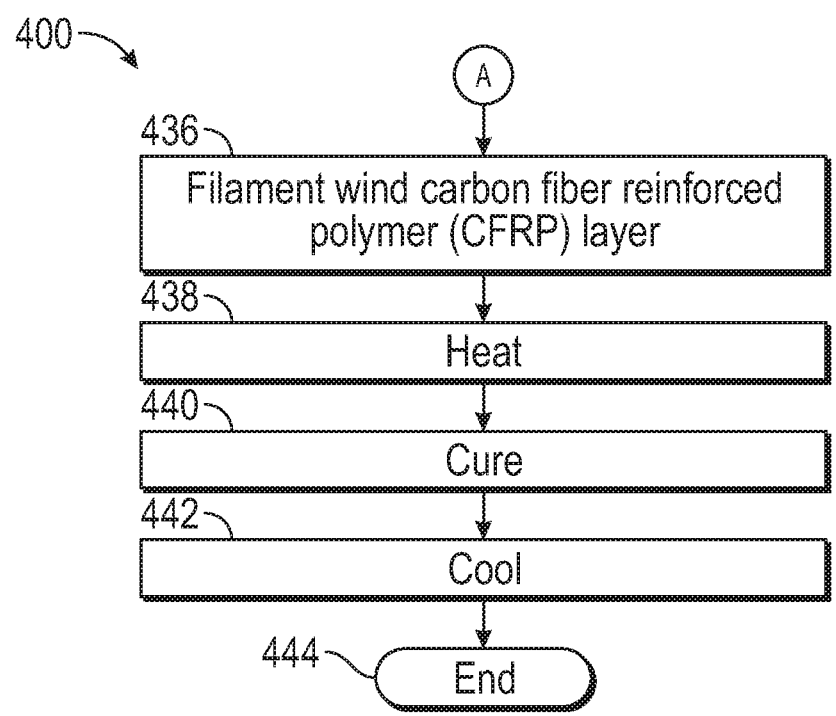
FIG. 9B is a second portion of the flow diagram of the method of manufacturing the gas storage tank of FIG. 1.

FIGS. 9A and 9B are a flow diagram of a method of manufacturing 400 the gas storage tank 10 of FIG. 1 (also referred to herein simply as the method 400). The method 400 starts at 402, and manufacturing of the liner 16 and the nanoporous carbon shell 18 may be carried out in parallel. For example, manufacturing of the nanoporous carbon shell 18 may begin at step 404, by placing at least one polymer 110 in a first mold 210 as depicted in FIG. 5. The first mold 210 may then be sealed at step 406, and the at least one polymer 110 may be pyrolyzed in the mold 210 at step 408, such as by heating according to the stepped temperature profile 206. The first mold 210 may then be withdrawn from the oven 220 and the nanoporous carbon half shell 18AA removed from the mold 210 in step 410 and allowed to cool in step 412 or actively cooled. Once cooled, the nanoporous carbon half shell 18AA is a rigid nanoporous carbon. Steps 404 to 412 are then repeated to manufacture the second half shell 18BB of the nanoporous carbon shell 18.

In parallel with manufacturing the nanoporous carbon shell 18, the method 400 may include step 414 at which resin for the liner 16 is molded in a second mold 300 such as by injection molding or blow molding. More specifically, the first liner half 16AA of the liner 16 is molded and is then removed from the second mold 300 in step 416 and allowed to cool or actively cooled in step 418. Steps 414 to 418 are repeated to manufacture the second liner half 16BB of the liner 16. Once both liner halves 16AA, 16BB are manufactured, the liner halves 16AA, 16BB are welded together at their adjacent cylindrical ends in step 420, and then the weld is machined to be flush with the outer side 28 of the liner 16 in step 422.

With the liner 16 and the nanoporous carbon half shells 18AA, 18BB manufactured, the method 400 moves to step 424 at which the bosses 22A, 22B are secured to the liner 16, a release agent 312A is applied to the outer side 28 of the liner 16 in step 426, and the nanoporous carbon half shells 18AA, 18BB are assembled over the bosses 22A, 22B and the liner 16 in step 428 so that the liner 16 is at the inner side 26 of the nanoporous carbon shell 18. Next, the nanoporous carbon half shells 18AA, 18BB may be bound together at the seam 314 by tape or adhesive in step 430. The same or a different release agent 312B may be applied to the outer side 30 of the nanoporous carbon shell 18 in step 432, and then in step 434 temporary clamps 316 may be secured to the bosses 22A, 22B as described herein.

With the liner 16, nanoporous carbon shell 18, and bosses 22A, 22B assembled to one another, they may be placed on a mandrel and the carbon fiber reinforced polymer layer 20 may then be filament wound onto the outer side 30 of the nanoporous carbon shell 18 in step 436. In step 438, the assembled gas storage tank 10 may be heated in an oven and then cured in step 440 as discussed herein. The gas storage tank 10 is then allowed to cool or is actively cooled in step 442, such as by cooling to room temperature. The method 400 is then complete and ends at 444.

While the best modes for carrying out the disclosure have been described in detail, those familiar with the art to which this disclosure relates will recognize various alternative designs and embodiments for practicing the disclosure within the scope of the appended claims.

What is claimed is:

1. A storage tank for pressurized gas, the storage tank comprising:
   a liner defining an interior cavity for storing the pressurized gas;
   a nanoporous carbon shell formed from at least one pyrolyzed polymer; wherein the liner is disposed at an inner side of the nanoporous carbon shell; and
   a carbon fiber reinforced polymer layer disposed on an outer side of the nanoporous carbon shell opposite from the liner;
   wherein the nanoporous carbon shell has an exposed surface at an exterior of the storage tank and is configured to permit gas permeated through the liner from the interior cavity to diffuse through the nanoporous carbon shell to the exposed surface.

2. The storage tank of claim 1, further comprising:
   a boss secured between the liner and the nanoporous carbon shell adjacent to the exposed surface, the boss further enclosing the interior cavity.

3. The storage tank of claim 2, wherein the boss is a first boss secured between a first end portion of the liner and a first end portion of the nanoporous carbon shell, and the storage tank further comprising:
   a second boss secured between a second end portion of the liner and a second end portion of the nanoporous carbon shell adjacent to an additional exposed surface at the exterior of the storage tank, the second boss further enclosing the interior cavity.

4. The storage tank of claim 1, wherein the at least one pyrolyzed polymer includes a copolymer precursor.

5. The storage tank of claim 1, wherein the nanoporous carbon shell is configured to maintain a preformed shape when a pressure level in the interior cavity is from 0 megapascals (MPa) to 100 MPa.

6. The storage tank of claim 1, wherein the liner is unattached to the inner side of the nanoporous carbon shell.

7. The storage tank of claim 1, wherein the at least one pyrolyzed polymer includes a precursor of poly(vinylidene chloride-co-vinyl chloride).

8. The storage tank of claim 7, wherein the pressurized gas is hydrogen gas.

9. The storage tank of claim 1, wherein the nanoporous carbon shell defines a plurality of nanopores each having a pore width of less than or equal to 1 nanometer.

10. The storage tank of claim 9, wherein the carbon fiber reinforced polymer layer includes a matrix of resin molecules each having a molecular width of greater than 1 nanometer.

11. A method of manufacturing a storage tank for pressurized gas, the method comprising:

pyrolyzing at least one polymer to form a nanoporous carbon shell; and disposing a liner at an inner side of the nanoporous carbon shell, the liner defining an interior cavity for storing the pressurized gas;

disposing a carbon fiber reinforced polymer layer at an outer side of the nanoporous carbon shell opposite from the liner;

wherein the nanoporous carbon shell has an exposed surface at an exterior of the storage tank and is configured to permit gas permeated through the liner from the interior cavity to diffuse through the nanoporous carbon shell to the exposed surface.

12. The method of manufacturing of claim 11, further comprising:

securing a boss to the liner and the nanoporous carbon shell, the boss further enclosing the interior cavity.

13. The method of manufacturing of claim 11, prior to disposing the liner at the inner side of the nanoporous carbon shell, applying a release agent to an outer side of the liner.

14. The method of manufacturing of claim 11, wherein disposing the carbon fiber reinforced polymer layer at the outer side of the nanoporous carbon shell is by filament winding the carbon fiber reinforced polymer layer.

15. The method of manufacturing of claim 14, further comprising, prior to filament winding the carbon fiber reinforced polymer layer at the outer side of the nanoporous carbon shell, applying a release agent to an outer side of the nanoporous carbon shell.

16. The method of manufacturing of claim 14, further comprising:

after filament winding the carbon fiber reinforced polymer layer at the outer side of the nanoporous carbon shell, heating the carbon fiber reinforced polymer layer; and curing the carbon fiber reinforced polymer layer.

17. The method of manufacturing of claim 11, wherein pyrolyzing the at least one polymer includes heating the at least one polymer at a heating temperature that varies according to a stepped temperature profile.

18. The method of manufacturing of claim 17, wherein the stepped temperature profile includes a first step at a first predetermined heating time at which the heating temperature increases to a first predetermined heating temperature, and a second step at a second predetermined heating time subsequent to the first predetermined heating time at which the heating temperature increases to a second predetermined heating temperature greater than the first predetermined heating temperature.

19. The method of manufacturing of claim 11, wherein the at least one polymer comprises a block copolymer including a carbon backbone, one or more halogens, and hydrogen.

20. The method of manufacturing of claim 11, wherein the at least one polymer comprises a mixture of a first halogenated polymer and a second halogenated polymer.

* * * * *